US012772250B2

(12) United States Patent
Yin et al.

(10) Patent No.: US 12,772,250 B2
(45) Date of Patent: Oct. 20, 2026

(54) CHANNEL RESOLUTION FOR PUCCH WITH HIGH PRIORITY HARQ-ACK, PUCCH WITH HIGH PRIORITY SR AND A LP PUSCH

(71) Applicant: SHARP KABUSHIKI KAISHA, Osaka (JP)

(72) Inventors: Zhanping Yin, Vancouver, WA (US); Kai Ying, Vancouver, WA (US); Kazunari Yokomakura, Osaka (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 254 days.

(21) Appl. No.: 18/727,483

(22) PCT Filed: Dec. 16, 2022

(86) PCT No.: PCT/JP2022/046391
§ 371 (c)(1),
(2) Date: Jul. 9, 2024

(87) PCT Pub. No.: WO2023/132205
PCT Pub. Date: Jul. 13, 2023

(65) Prior Publication Data

US 2025/0081199 A1 Mar. 6, 2025

Related U.S. Application Data

(60) Provisional application No. 63/298,149, filed on Jan. 10, 2022.

(51) Int. Cl.
*H04W 72/21* (2023.01)
*H04L 5/00* (2006.01)

(52) U.S. Cl.
CPC .......... *H04W 72/21* (2023.01); *H04L 5/0055* (2013.01)

(58) Field of Classification Search
CPC ......... H04W 72/0446; H04W 72/1268; H04W 72/21; H04W 72/23
See application file for complete search history.

(56) References Cited

U.S. PATENT DOCUMENTS

2023/0379962 A1* 11/2023 Andersson ............ H04W 72/02

OTHER PUBLICATIONS

Huawei et al., "Intra-UE multiplexing enhancements", R1-2110819, 3GPPTSG RAN WG1 Meeting #107-e, e-Meeting, Nov. 11-19, 2021.
Moderator (CATT), "Summary #2 of email thread [107-e-NR-R17-IIoT-URLLC-03]", R1-2112712, S3GPP TSG RAN WG1 #107-e, e-Meeting, Nov. 11-19, 2021.
Sharp, "Enhancements on intra-UE UCI multiplexing and channel collision resolution framework", R1-2112014, 3GPP TSG RAN WG1 #107-e, e-Meeting, Nov. 11-19, 2021.

* cited by examiner

*Primary Examiner* — Sam Bhattacharya
(74) *Attorney, Agent, or Firm* — ScienBiziP, P.C.

(57) ABSTRACT

A user equipment (UE) is described. The UE includes circuitry configured to determine that a low priority (LP) physical uplink shared channel (PUSCH) overlaps with a high priority (HP) physical uplink control channel (PUCCH) for hybrid automatic repeat request-acknowledgement (HARQ-ACK) and a HP scheduling request (SR) PUCCH with a positive SR, where the PUCCH with positive HP SR does not overlap with the HP PUCCH with HARQ-ACK.

3 Claims, 9 Drawing Sheets

CHANNEL RESOLUTION FOR PUCCH WITH HIGH PRIORITY HARQ-ACK, PUCCH WITH HIGH PRIORITY SR AND A LP PUSCH

CROSS REFERENCE

This Nonprovisional application claims priority under 35 U.S.C. § 119 on provisional Application No. 63/298,149 on Jan. 10, 2022, the entire contents of which are hereby incorporated by reference.

TECHNICAL FIELD

The present disclosure relates generally to communication systems. More specifically, the present disclosure relates to channel resolution for PUCCH with high priority HARQ-ACK and/or PUCCH with high priority SR and a LP PUSCH.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: circuitry configured to: determine that a low priority (LP) physical uplink shared channel (PUSCH) overlaps with a high priority (HP) physical uplink control channel (PUCCH) for hybrid automatic repeat request-acknowledgement (HARQ-ACK) and a HP scheduling request (SR) PUCCH with a positive SR, wherein the PUCCH with positive HP SR does not overlap with the HP PUCCH with HARQ-ACK.

In one example, a base station (gNB), comprising: circuitry configured to: determine that a low priority (LP) physical uplink shared channel (PUSCH) overlaps with a high priority (HP) physical uplink control channel (PUCCH) for hybrid automatic repeat request-acknowledgement (HARQ-ACK) and a HP scheduling request (SR) PUCCH with a positive SR, wherein the PUCCH with positive HP SR does not overlap with the HP PUCCH with HARQ-ACK.

DESCRIPTION OF EMBODIMENTS

Figure 1:
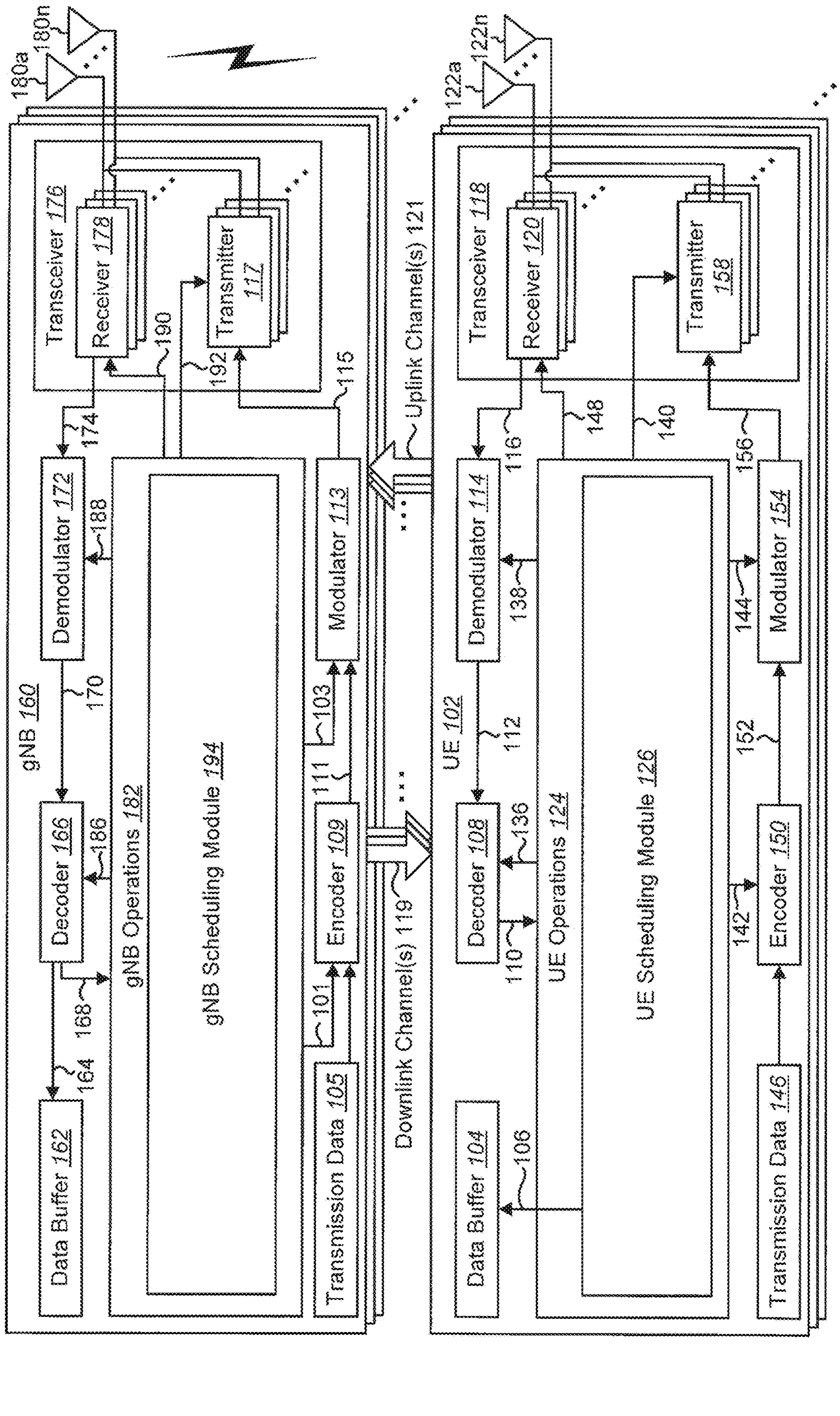
FIG. 1 is a block diagram illustrating one implementation of one or more gNBs 160 and one or more UEs 102 in which systems and methods for channel dropping behaviors may be implemented.

A user equipment (UE) is described. The UE includes circuitry configured to, in a case that a high priority (HP) physical uplink control channel (PUCCH) for up to 2 bits of HP hybrid automatic repeat request-acknowledgement (HARQ-ACK) with PUCCH format 0 or PUCCH format 1 overlaps with one or more HP scheduling request (SR) PUCCH resources with PUCCH format 0 or PUCCH format 1 and a low priority (LP) physical uplink shared channel (PUSCH), and if HP HARQ-ACK multiplexing on the LP PUSCH is configured and/or dynamically indicated by downlink control information (DCI), append 1 bit for HP SR to the HP HARQ-ACK. A bit of 1 indicates a positive HP SR or a bit of 0 indicates a negative HP SR. The circuitry is also configured to multiplex the combined up to 2 bits of HARQ-ACK and the 1 bit of SR on the LP PUSCH as HP HARQ-ACK bits. The circuitry may be configured to, in a case that a HP PUCCH for up to 2 bits of HP HARQ-ACK with PUCCH format 1 overlaps with only HP SR PUCCH resources with PUCCH format 0 and a LP PUSCH, and if HP HARQ-ACK multiplexing on LP PUSCH is configured and/or dynamically indicated by DCI, ignore the HP SR (even if it is positive), and multiplex only the up to 2 bits of HP HARQ-ACK on the LP PUSCH.

A base station (gNB) is also described. The base station includes circuitry configured to, in a case that a high priority (HP) physical uplink control channel (PUCCH) for up to 2 bits of HP hybrid automatic repeat request-acknowledgement (HARQ-ACK) with PUCCH format 0 or PUCCH format 1 overlaps with one or more HP scheduling request (SR) PUCCH resources with PUCCH format 0 or PUCCH format 1 and a low priority (LP) physical uplink shared channel (PUSCH), and if HP HARQ-ACK multiplexing on the LP PUSCH is configured and/or dynamically indicated by downlink control information (DCI), receive a combined up to 2 bits of HARQ-ACK and 1 bit of SR multiplexed on the LP PUSCH as HP HARQ-ACK bits. The 1 bit for HP SR is appended to the HP HARQ-ACK, with a bit of 1 indicating a positive HP SR or a bit of 0 indicating a negative HP SR. The circuitry may be configured to, in a case that a HP PUCCH for up to 2 bits of HP HARQ-ACK with PUCCH format 1 overlaps only with HP SR PUCCH resources with PUCCH format 0 and a LP PUSCH, and if HP HARQ-ACK multiplexing on LP PUSCH is configured and/or dynamically indicated by DCI, receive only the up to 2 bits of HP HARQ-ACK multiplexed on the LP PUSCH assuming the HP SR is ignored (even if it is positive).

Another UE is described. The UE includes circuitry configured to, in a case that a high priority (HP) physical uplink control channel (PUCCH) for more than 2 bits of HP hybrid automatic repeat request-acknowledgement (HARQ-ACK) with PUCCH format 2 or PUCCH format 3 or PUCCH format 4 overlaps with K PUCCHs for respective K HP SRs and a low priority (LP) physical uplink shared channel (PUSCH), and if HP HARQ-ACK multiplexing on the LP PUSCH is configured and/or dynamically indicated by downlink control information (DCI), append $\lfloor \log_2(K+1) \rfloor$ bits for HP SR to the HP HARQ-ACK. The circuitry is also configured to multiplex the combined HP HARQ-ACK bits and the appended HP SR bits on the LP PUSCH as HP HARQ-ACK bits.

Another base station (gNB) is described. The base station includes circuitry configured to, in a case that a high priority (HP) physical uplink control channel (PUCCH) for more than 2 bits of HP hybrid automatic repeat request-acknowledgement (HARQ-ACK) with PUCCH format 2 or PUCCH format 3 or PUCCH format 4 overlaps with K PUCCHs for respective K HP SRs and a low priority (LP) physical uplink shared channel (PUSCH), and if HP HARQ-ACK multiplexing on the LP PUSCH is configured and/or dynamically indicated by downlink control information (DCI), receive a combination of HP HARQ-ACK bits and HP SR bits multiplexed on the LP PUSCH as HP HARQ-ACK bits. $\lfloor \log_2(K+1) \rfloor$ bits for HP SR are appended to the HP HARQ-ACK.

Another UE is described. The UE includes circuitry configured to determine that a low priority (LP) physical uplink shared channel (PUSCH) overlaps with a high priority (HP) physical uplink control channel (PUCCH) for hybrid automatic repeat request-acknowledgement (HARQ-ACK) and a HP scheduling request (SR) PUCCH with a positive SR, where the PUCCH with positive HP SR does not overlap with the HP PUCCH with HARQ-ACK. The circuitry may be configured to drop the LP PUSCH and transmit the HP PUCCH with HP HARQ-ACK and the HP SR PUCCH with a positive SR.

The circuitry may be configured to multiplex the HP HARQ-ACK on the LP PUSCH, where the HP SR is ignored and cancels the HP PUCCH with positive SR. Channel dropping may be determined based on the order of the HP PUCCH with HARQ-ACK and the HP PUCCH with positive SR. The circuitry may be configured to, if the HP PUCCH with HP HARQ-ACK starts earlier than the HP PUCCH with positive SR, multiplex the HP HARQ-ACK on the LP PUSCH, and cancel the HP SR PUCCH with positive SR. The circuitry may be configured to, if the HP PUCCH with positive HP SR starts earlier than the HP PUCCH with HP HARQ-ACK, cancel the LP PUSCH, and transmit the HP PUCCH with HP HARQ-ACK and the HP SR PUCCH with a positive SR.

The circuitry may be configured to multiplex the HP HARQ-ACK on the LP PUSCH. The LP PUSCH with HP HARQ-ACK may be punctured at least from the overlapping symbol with the HP PUCCH with positive SR.

Another base station (gNB) is described. The base station includes circuitry configured to determine that a low priority (LP) physical uplink shared channel (PUSCH) overlaps with a high priority (HP) physical uplink control channel (PUCCH) for hybrid automatic repeat request-acknowledgement (HARQ-ACK) and a HP scheduling request (SR) PUCCH with a positive SR, where the PUCCH with positive HP SR does not overlap with the HP PUCCH with HARQ-ACK.

The LP PUSCH may be dropped. The circuitry may be configured to receive the HP PUCCH with HP HARQ-ACK and the HP SR PUCCH. The circuitry may be configured to receive the HP HARQ-ACK multiplexed on the LP PUSCH, where the HP SR is ignored.

Channel dropping may be determined based on the order of the HP PUCCH with HARQ-ACK and the HP PUCCH with positive SR. If the HP PUCCH with HP HARQ-ACK starts earlier than the HP PUCCH with positive SR, the circuitry may be configured to receive the HP HARQ-ACK on the LP PUSCH and ignore the HP SR. If the HP PUCCH with positive HP SR starts earlier than the HP PUCCH with HP HARQ-ACK, the circuitry may be configured to receive the HP PUCCH with HP HARQ-ACK and the HP SR PUCCH with a positive SR.

The circuitry may be configured to receive the HP HARQ-ACK multiplexed on the LP PUSCH. The LP PUSCH with HP HARQ-ACK may be punctured by the HP PUCCH with positive SR at least from the overlapping symbol with the HP PUCCH with positive SR.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and/or other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In some approaches, scheduling request (SR) multiplexing on a physical uplink shared channel (PUSCH) is not supported. In case of overlapping between a PUCCH with positive SR and a PUSCH, the SR is dropped if the SR priority is the same as the priority of the PUSCH. The channel with a larger priority index (i.e., high priority) is transmitted and the channel with a smaller priority index (i.e., low priority) is dropped. For overlapping between a low priority (LP) PUSCH and a PUCCH with a positive high priority (HP) SR, the PUCCH with the positive HP SR is transmitted, and the LP PUSCH is dropped. For overlapping between a HP PUSCH and a PUCCH with a positive LP SR, the HP PUSCH is transmitted, and the PUCCH with the positive LP SR is dropped.

If a LP PUSCH overlaps with a PUCCH with a positive HP SR, the LP PUSCH is dropped. However, in some approaches, the HP HARQ-ACK may be multiplexed on a LP PUSCH. Accordingly, dropping the LP PUSCH by the HP SR may drop the more important HP HARQ-ACK multiplexed on the PUSCH.

Some examples of the systems and methods described herein may provide collision resolution procedure between channels with different priorities. In some examples, HP HARQ-ACK and HP SR may be multiplexed in a first step before UCI multiplexing on a LP PUSCH. Approaches may be specified to perform UCI multiplexing or channel dropping based on different channel overlapping conditions.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for channel dropping behaviors may be implemented. The one or more UEs 102 communicate with one or more gNBs 160 using one or more antennas 122*a-n*. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform joint coding and/or multiplexing of deferred SPS HARQ-ACK as described herein. For instance, the UE 102, the UE operations module 124, and/or the UE scheduling module 126 may perform one or more of the methods, operations, functions, approaches, and/or examples described herein.

A high priority UCI may be a high priority HARQ-ACK or a high priority SR. A high priority HARQ-ACK corresponds to a high priority PDSCH transmission. A PDSCH may be dynamically scheduled by downlink control information (DCI) or configured by semi-persistent scheduling (SPS). The priority of a scheduled PDSCH transmission may be determined by the priority indication in the scheduling DCI. The priority of a SPS PDSCH transmission may be configured by higher layer signaling. A high priority PUCCH resource may be used to report high priority HARQ-ACK with or without SR. A high priority PDSCH, high priority HARQ-ACK, or high priority PUCCH resource may be configured to support URLLC services. The high priority may be configured with a priority index 1. Thus, a high priority PDSCH/PUSCH may be a PDSCH/PUSCH with priority index 1, a high priority HARQ-ACK may be a HARQ-ACK with priority index 1 corresponding to a PDSCH with priority index 1. A PUCCH resource with priority index 1 may be used to report UCI with priority index 1.

A low priority UCI may be a low priority HARQ-ACK or a low priority SR, or a CSI report, etc. A low priority HARQ-ACK corresponds to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource may be used to report low priority UCI. A low priority PDSCH, low priority HARQ-ACK, or low priority PUCCH resource may be configured to support eMBB services. The low priority may be configured with a priority index 0. Thus, a low priority PDSCH/PUSCH may be a PDSCH/PUSCH with priority index 0, a low priority HARQ-ACK may be a HARQ-ACK with priority index 0 corresponding to a PDSCH with priority index 0. A PUCCH resource with priority index 0 may be used to report UCI with priority index 0.

For HARQ-ACK priorities, if a UE 102 is provided a pdschHARQ-ACK-Codebook-List, the UE 102 can be indicated by the pdschHARQ-ACK-Codebook-List to generate one or two HARQ-ACK codebooks. If the UE 102 is indicated to generate two HARQ-ACK codebooks, a first HARQ-ACK codebook may be associated with a PUCCH of priority index 0 and a second HARQ-ACK codebook may be associated with a PUCCH of priority index 1.

For SR priorities, a UE 102 may be configured, by SchedulingRequestResourceConfig, a set of configurations for SR in a PUCCH transmission using either PUCCH format 0 or PUCCH format 1. A UE 102 may be configured, by schedulingRequestIDForBFR, a configuration for a link recovery request (LRR) in a PUCCH transmission using either PUCCH format 0 or PUCCH format 1. The UE 102 can be configured, by schedulingRequestPriority in SchedulingRequestResourceConfig, a priority index 0 or a priority index 1 for the SR.

A PUSCH or a PUCCH, including repetitions if any, may be of priority index 0 or of priority index 1. If a priority index is not provided for a PUSCH or a PUCCH, the priority index may be 0. If in an active DL BWP a UE 102 monitors PDCCH either for detection of DCI format 0_1 and DCI format 1_1 or for detection of DCI format 0_2 and DCI format 1_2, a priority index may be provided by a priority indicator field. If a UE 102 indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 may schedule a PUSCH transmission of any priority and a DCI format 1_1 or a DCI format 1_2 may schedule a PDSCH reception and trigger a PUCCH transmission with corresponding HARQ-ACK information of any priority. If, after resolving overlapping for PUCCH and/or PUSCH transmissions of a same priority index, a UE 102 determines to transmit:

a first PUCCH of larger priority index, a PUSCH or a second PUCCH of smaller priority index, and a transmission of the first PUCCH would overlap in time with a transmission of the PUSCH or the second PUCCH, the UE 102 may not transmit the PUSCH or the second PUCCH;

a PUSCH of larger priority index, a PUCCH of smaller priority index, and a transmission of the PUSCH would overlap in time with a transmission of the PUCCH, the UE 102 may not transmit the PUCCH; or a first PUSCH of larger priority index on a serving cell, a second PUSCH of smaller priority index on the serving cell, and a transmission of the first PUSCH would overlap in time with a transmission of the second PUSCH, the UE 102 may not transmit the second PUSCH, where at least one of the two PUSCH is not scheduled by a DCI format.

In NR Rel-16, a UE 102 may only multiplex UCIs with a same priority index in a PUCCH or a PUSCH. A PUCCH or a PUSCH may be assumed to have a same priority index as a priority index of UCIs a UE 102 multiplexes in the PUCCH or the PUSCH. For intra-UE collision between uplink channels with different priorities, the uplink channel with high priority may be transmitted, and the low priority channel may be dropped.

If a UE 102 is provided two PUCCH-Config:

if the UE 102 is provided subslotLengthForPUCCH-r16 in the first PUCCH-Config, the PUCCH resource for any SR configuration with priority index 0 or any CSI report configuration in any PUCCH-Config may be within the subslotLengthForPUCCH-r16 symbols in the first PUCCH-Config; or if the UE 102 is provided subslotLengthForPUCCH-r16 in the second PUCCH-Config, the PUCCH resource for any SR configuration with priority index 1 in any PUCCH-Config may be within the subslotLengthFor-PUCCH-r16 symbols in the second PUCCH-Config.

In some examples, if a UE 102 is not provided subslot-Length-ForPUCCH, a slot for an associated PUCCH transmission may include all symbols in a slot, 14 symbols with normal cyclic prefix, or 12 symbols with extended cyclic prefix. And, if a UE 102 is provided subslotLength-For-PUCCH, a slot for an associated PUCCH transmission may include a number of symbols indicated by subslotLength-ForPUCCH.

In some approaches, UCI multiplexing on PUSCH may be performed in accordance with the following. If a PUCCH carrying a UCI overlaps with a PUSCH, the UCI may be multiplexed on PUSCH if simultaneous PUCCH and PUSCH is not configured or supported. In some examples, only HARQ-ACK and CSI may be multiplexed on PUSCH, and SR may not be multiplexed on PUSCH in some approaches.

When UCI is multiplexed on a PUSCH, the overlapping condition of the PUCCH for a UCI type may be evaluated separately with the PUSCH, and the UCI multiplexing of different UCI types may be multiplexed on PUSCH based on the UCI types, for example, the HARQ-ACK may be multiplexed first based on the number of HARQ-ACK bits, followed by CSI which is rate matched after the HARQ-ACK multiplexing.

Offset values may be defined for a UE 102 to determine a number of resources for multiplexing HARQ-ACK information and for multiplexing CSI reports in a PUSCH. Offset values may also be defined for multiplexing configured grant UCI (CG-UCI) in a configured grant PUSCH (CG-PUSCH). The offset values may be signaled to a UE 102 either by a DCI format scheduling the PUSCH transmission or by higher layers.

In Rel-16, for a PUSCH with a given priority index, only the UCI with the same priority that is configured on a PUCCH with the same priority, may be multiplexed on the PUSCH. If the UCI and PUSCH have different priorities, a channel dropping rule is defined so that the high priority channel is transmitted, and the low priority channel is dropped in case of channel overlapping. Dropping timelines are defined for different types of UL channels and UCI types.

In NR Rel-17, UCI of different priorities may be multiplexed on a single PUCCH or PUSCH. Furthermore, a UCI with a given priority may be multiplexed on a PUSCH with different priorities. Thus, using HARQ-ACK as an example, the followings UCI multiplexing scenarios may be supported:

HP HARQ-ACK on HP PUSCH
LP HARQ-ACK on LP PUSCH
HP HARQ-ACK on LP PUSCH
LP HARQ-ACK on HP PUSCH

Different offset values or sets of offset values may be configured for different combinations between the HARQ-ACK priority and PUSCH priority. Furthermore, HARQ-ACK of different priorities may be reported on a single PUSCH, including:

HP HARQ-ACK and LP HARQ-ACK on LP PUSCH
HP HARQ-ACK and LP HARQ-ACK on HP PUSCH

CSI may be treated as low priority in Rel-16. If CSI is present on a LP PUSCH, the HP UCI may also be multiplexed on a LP PUSCH, including HP HARQ-ACK and CSI on LP PUSCH
HP HARQ-ACK, LP HARQ-ACK and CSI on LP PUSCH The CSI may be a periodic CSI, a semi-persistent CSI, or an aperiodic CSI. When multiplexed together with HP UCI on PUSCH, the low priority CSI may be limited to CSI part 1 only.

In Rel-17, CSI enhancements may be considered, and some new CSI reports may be supported for URLLC or the high priority service. The new CSI reports may be treated as high priority, or indicated as high priority (i.e., priority index 1). The HP CSI may be reported together with HP HARQ-ACK on a PUCCH or PUSCH.

Some approaches for collision handling between PUCCH with positive SR and PUSCH are described as follows. The Scheduling Request (SR) is a special physical layer message for UE 102) used for requesting UL-SCH resources for a new transmission. The MAC entity may be configured with zero, one, or more SR configurations. An SR configuration may include a set of PUCCH resources for SR across different BWPs and cells. For a logical channel or for SCell beam failure recovery and for consistent listen before talk (LBT) failure recovery, at most one PUCCH resource for SR may be configured per bandwidth part (BWP).

Each SR configuration may correspond to one or more logical channels and/or to SCell beam failure recovery and/or to consistent LBT failure recovery. Each logical channel, SCell beam failure recovery, and/or consistent LBT failure recovery may be mapped to zero or one SR configuration, which is configured by RRC. The SR configuration of the logical channel that triggered a buffer status report (BSR) or the SCell beam failure recovery or the consistent LBT failure recovery (if such a configuration exists) is considered as corresponding SR configuration for the triggered SR. Any SR configuration may be used for an SR triggered by Pre-emptive BSR.

A UE 102 may be configured, by SchedulingRequestResourceConfig, a set of configurations for SR in a PUCCH transmission using either PUCCH format 0 or PUCCH format 1. A UE 102 may be configured, by schedulingRequestID-BFR-SCell-r16, a configuration for LRR in a PUCCH transmission using either PUCCH format 0 or PUCCH format 1. The UE 102 may be provided, by phy-PriorityIndex-r16 in SchedulingRequestResourceConfig, a priority index 0 or a priority index 1 for the SR. If the UE 102 is not provided a priority index for SR, the priority index may be 0.

The UE 102 may transmit a PUCCH in the PUCCH resource for the corresponding SR configuration only when the UE 102 transmits a positive SR. For a positive SR transmission using PUCCH format 0, the UE 102 may transmit the PUCCH by obtaining initial cycle shift $m_0$ as described for HARQ-ACK information and by setting an additional cycle shift $m_{cs}=0$. For a positive SR transmission using PUCCH format 1, the UE 102 may transmit the PUCCH by setting the information bit b(0)=0. If the PUCCH for a positive SR does not overlap with another PUCCH or PUSCH, the PUCCH for the positive SR may be transmitted at the configured PUCCH resource.

Figure 8:
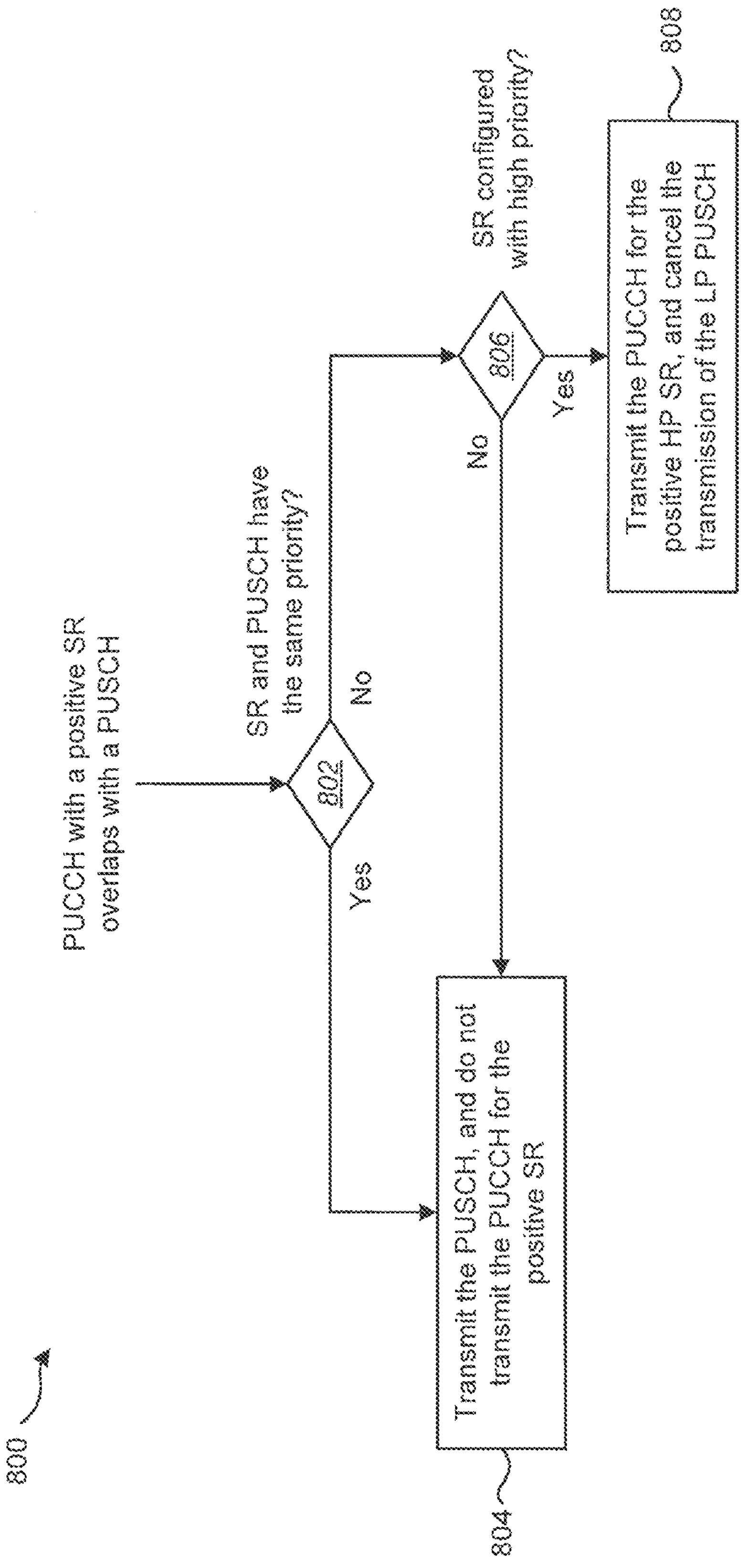
FIG. 8 is a flow diagram illustrating a method by a UE for handling SR and PUSCH collision.

In NR, up to 8 SR may be configured. In some NR approaches, the SR cannot be reported on PUSCH as illustrated in FIG. 8. Some problems may occur with dropping for a SR collision with PUSCH. Since SR cannot be multiplexed on a PUSCH in those approaches, the channel dropping approaches may function for some scenarios (e.g., the SR is dropped if the PUCCH of a positive SR overlaps with a PUSCH with the same priority, and the LP SR is dropped if the PUCCH of a positive SR with priority index 0 overlaps with a PUSCH with a priority index 1). In these approaches, however, for overlapping between a PUCCH with a positive SR with high priority and a PUSCH with low priority, the PUCCH with high priority SR has a high priority and will be transmitted, and the PUSCH with low priority is dropped. For example, if a UE would transmit the following channels that would overlap in time between a first PUCCH of larger priority index with SR and a PUSCH of smaller priority index, the UE is expected to cancel the PUSCH transmissions of smaller priority index before the first symbol overlapping with the PUCCH transmission of the larger priority index. This behavior ensures that the high priority SR is reported with a tradeoff of a dropped LP PUSCH transmission. Since an SR may only carry 1 bit information, the overhead of dropping a PUSCH is significant because the base station (e.g., gNB) may need to reschedule for the UE to retransmit the PUSCH. Furthermore, since UCI can be multiplexed on a LP PUSCH, dropping the LP PUSCH by a HP SR PUCCH may also drop UCI multiplexed on the LP PUSCH. Especially, if a high priority HARQ-ACK is multiplexed on a LP PUSCH, dropping the LP PUSCH by a HP SR PUCCH may drop the more important HP HARQ-ACK information on the LP PUSCH.

The method 800 described in relation to FIG. 8 illustrates an example of techniques that may be utilized in accordance with some of the systems and methods described herein. For example, the UE 102 (e.g., UE operations module 124 and/or UE scheduling model 126) may perform one or more of the operations described in relation to FIG. 8, FIG. 9, and/or FIG. 10.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein. In some examples, the gNB scheduling module 194 may be utilized to configure dropping and/or puncturing procedures and/or to receive communications from a UE in accordance with the dropping and/or puncturing procedures described herein. For instance, the gNB 160, the gNB operations module 182, and/or the gNB scheduling module 194 may receive transmissions from the UE in accordance with one or more of the methods (e.g., method 800), operations, functions, approaches, and/or examples described herein. In some examples, a base station (e.g., gNB 160, gNB operation module 182, and/or gNB scheduling module 194) may perform one or more of the operations described in relation to FIG. 8, FIG. 9, and/or FIG. 10.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
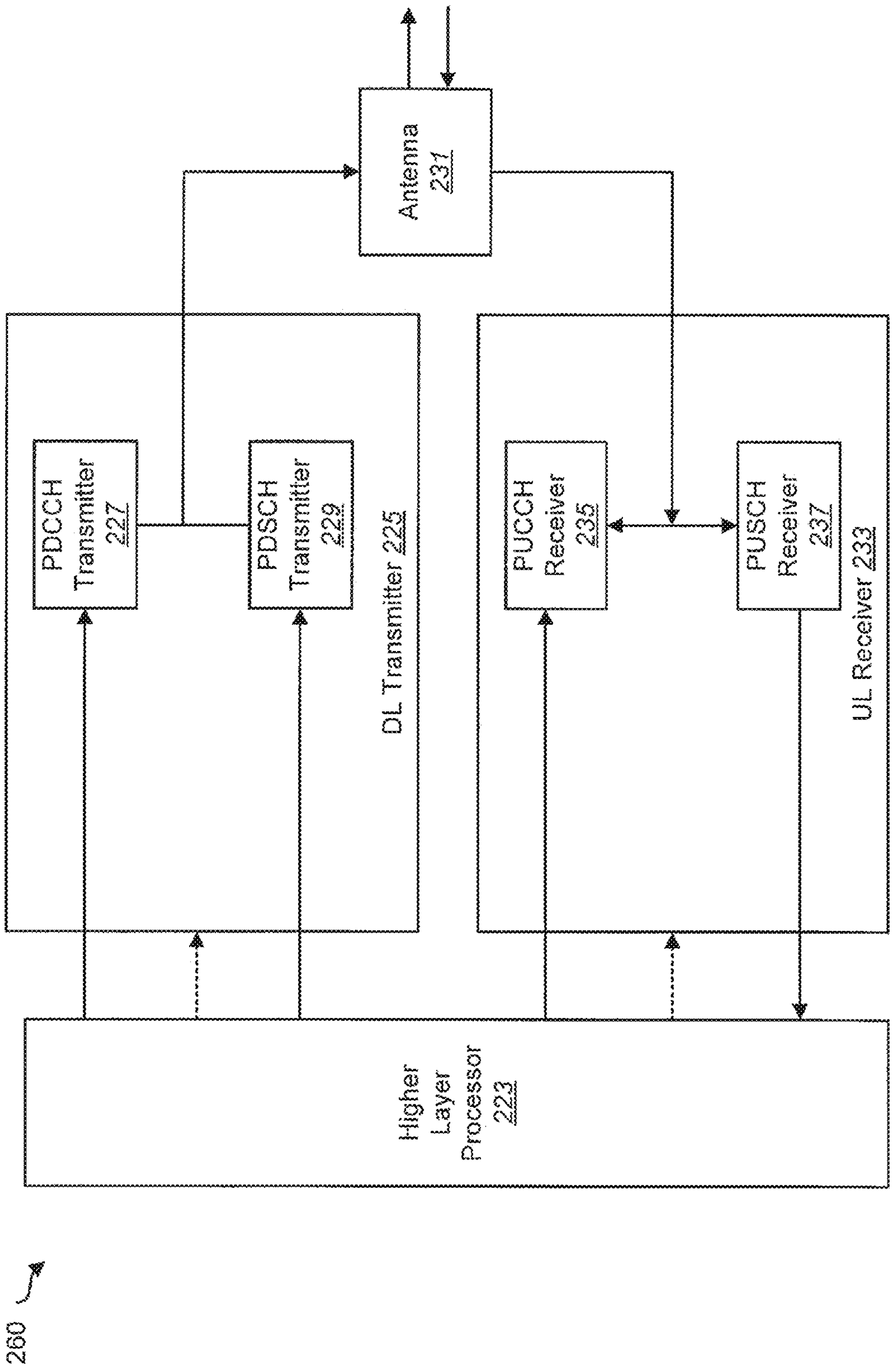
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
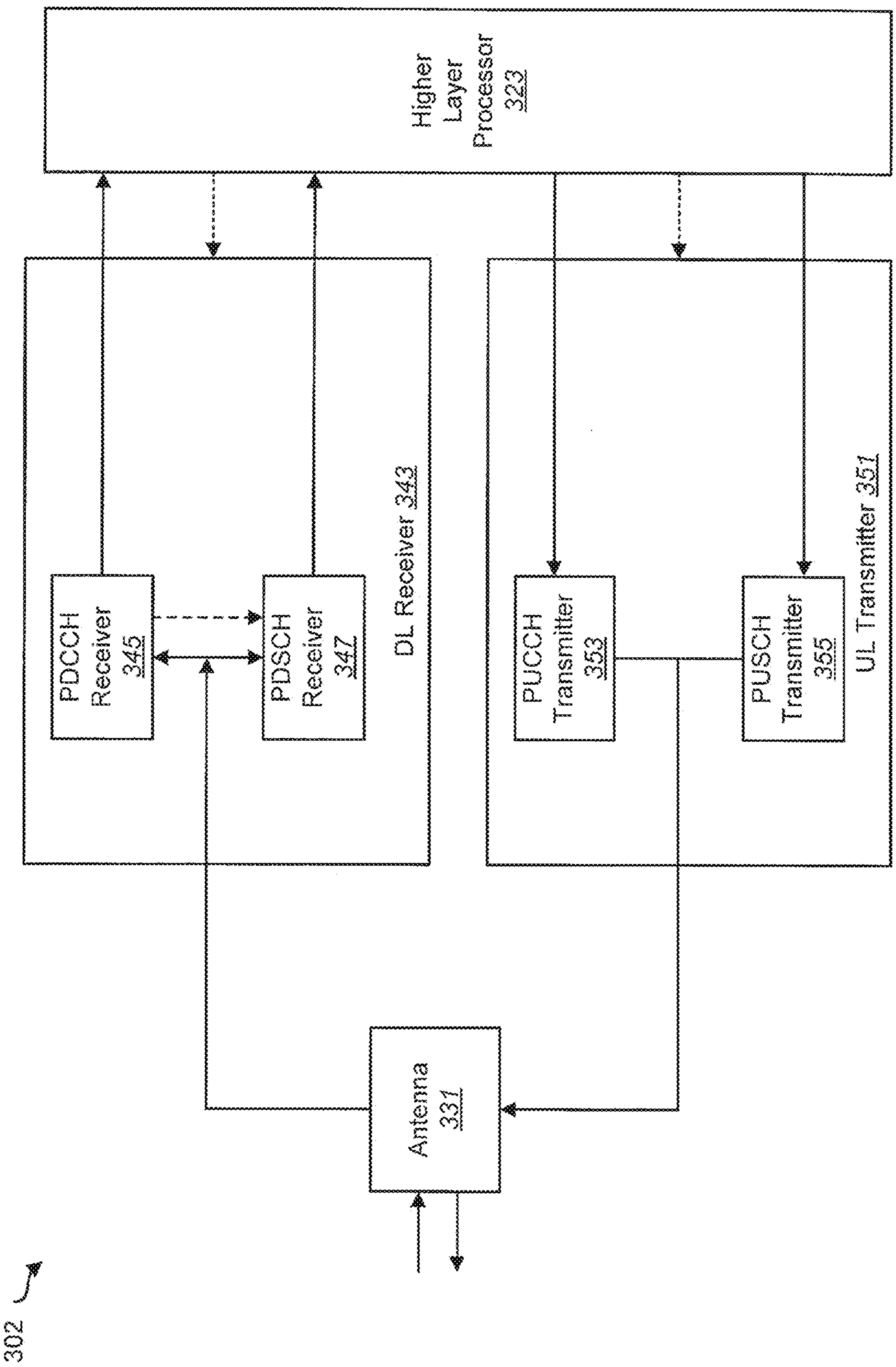
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323 DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
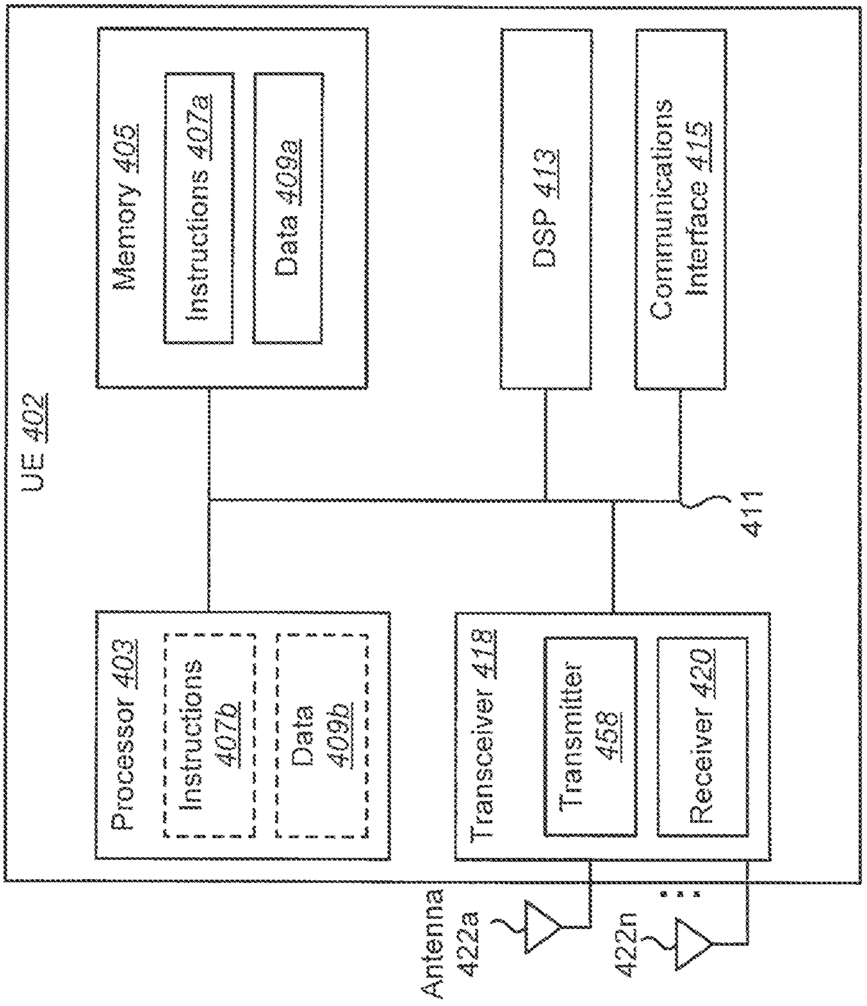
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. In some examples, the UE 402 may perform one or more of the methods, functions, operations, and/or examples, etc., described herein. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions 407*a* and data 409*a* to the processor 403. A portion of the memory 405 may also include non-volatile random-access memory (NVRAM). Instructions 407*b* and data 409*b* may also reside in the processor 403. Instructions 407*b* and/or data 409*b* loaded into the processor 403 may also include instructions 407*a* and/or data 409*a* from memory 405 that were loaded for execution or processing by the processor 403. The instructions 407*b* may be executed by the processor 403 to implement the methods described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422*a-n* are attached to the housing and electrically coupled to the transceiver 418.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
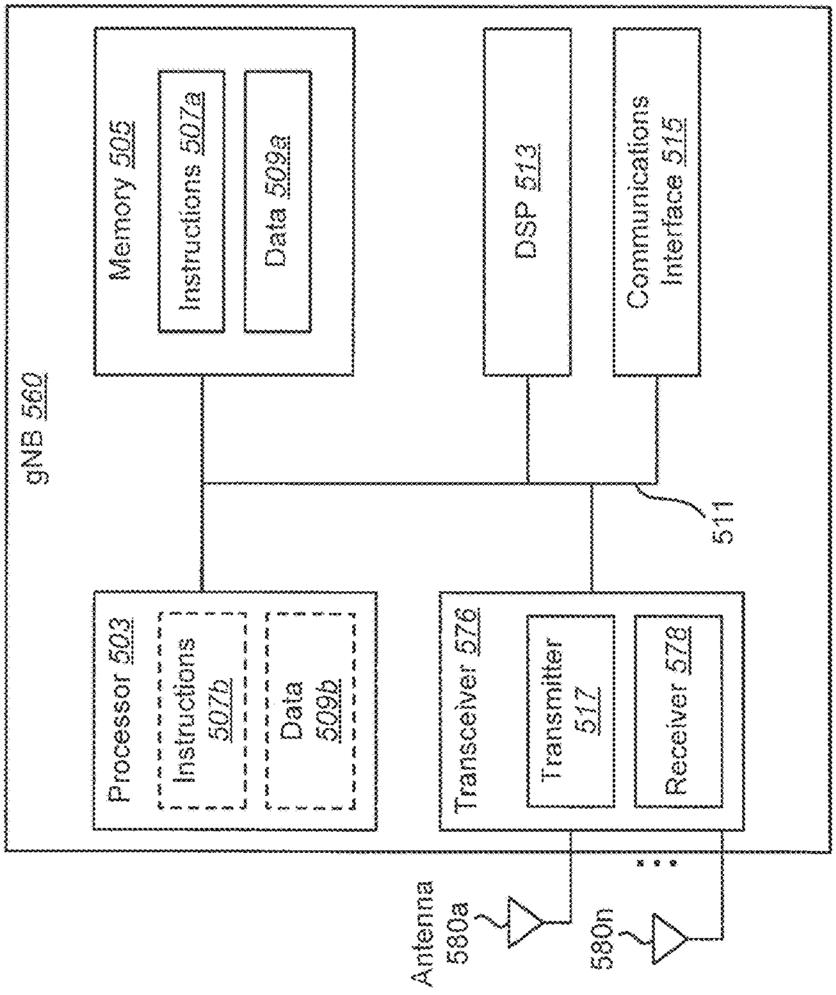
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. In some examples, the gNB 560 may perform one or more of the methods, functions, operations, and/or examples, etc., described herein. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507*a* and data 509*a* to the processor 503. A portion of the memory 505 may also include non-volatile random-access memory (NVRAM). Instructions 507*b* and data 509*b* may also reside in the processor 503. Instructions 507*b* and/or data 509*b* loaded into the processor 503 may also include instructions 507*a* and/or data 509*a* from memory 505 that were loaded for execution or processing by the processor 503. The instructions 507*b* may be executed by the processor 503 to implement the methods described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580*a-n* are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
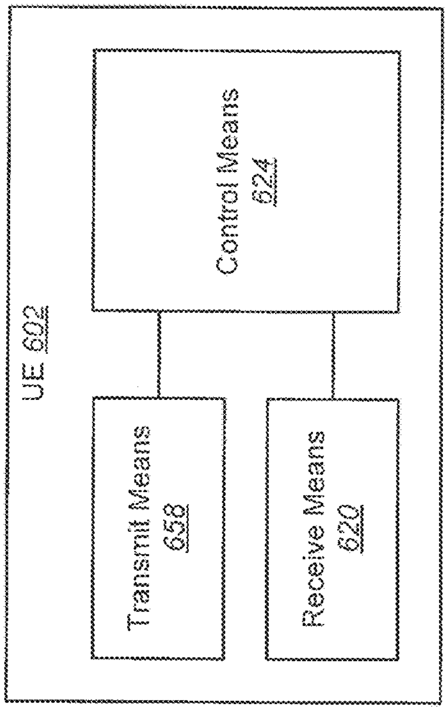
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
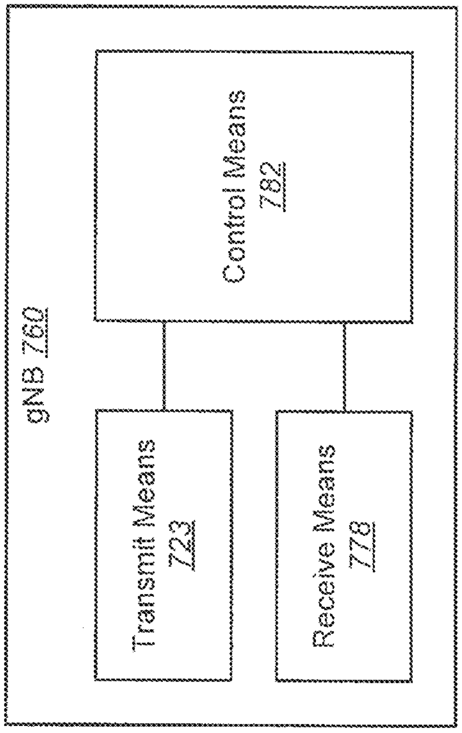
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

FIG. 8 is a flow diagram illustrating a method 800 by a UE for handling SR and PUSCH collision. For instance, FIG. 8 illustrates a problem that may occur with some approaches to handling SR and PUSCH collisions. The method 800 illustrates an example of SR and PUSCH collision handling when a PUCCH with a positive SR overlaps with a PUSCH. For example, a UE may determine 802 whether an SR and a PUSCH have the same priority. For instance, the UE may determine whether a priority index for the SR is the same as a priority index for the PUSCH.

In a case that the SR and the PUSCH have the same priority, the UE transmits 804 the PUSCH and does not transmit the PUCCH for the positive SR. Accordingly, the SR may be dropped. In this case, the base station may receive the PUSCH and does not receive the PUCCH for the positive SR.

In a case that the SR and PUSCH do not have the same priority, the UE may determine 806 whether the SR is configured with high priority. For instance, the UE may determine whether the priority index for the SR is 1 (indicating high priority, for instance). In a case that the SR is not configured with high priority, the UE may transmit 804 the PUSCH and may not transmit the PUCCH for the positive SR. In a case that the SR is configured with high priority, the UE transmits 808 the PUCCH for the positive HP SR and may cancel the transmission of the LP PUSCH. In this case, the base station may receive the PUCCH for the positive HP SR and does not receive the LP PUSCH.

As illustrated in FIG. 8, for overlapping between a PUCCH with a positive SR and a PUSCH with the same priority, the SR may be dropped and not reported. For overlapping between a PUCCH with a positive SR and a PUSCH with different priorities, the PUCCH or PUSCH with high priority or larger priority index may be transmitted, and the PUCCH or PUSCH with low priority or smaller priority index may be dropped.

Thus, for overlap between a PUCCH with a positive SR with low priority and a PUSCH with high priority, the PUCCH with low priority SR may be dropped and the high priority PUSCH may be transmitted. Similarly, for overlapping between a PUCCH with a positive SR with high priority and a PUSCH with low priority, the PUCCH with high priority SR has a higher priority and may be transmitted, and the PUSCH with low priority may be dropped. For example, if a UE 102 would transmit channels that would overlap in time between a first PUCCH of larger priority index with SR and a PUSCH of smaller priority index, the UE 102 is expected to cancel the PUSCH transmissions of smaller priority index before the first symbol overlapping with the PUCCH transmission of larger priority index.

In a case of PUSCH dropping by a HP PUCCH, the PUSCH transmission may be cancelled (e.g., cancelled at least) from the overlapping symbol with the HP PUCCH, and the PUSCH transmission may not be resumed after cancellation. If the transmission of the HP PUCCH is known before the starting symbol of the PUSCH, the PUSCH may be fully dropped without transmission.

Some examples of the systems and methods described herein may provide channel collision resolution between channels with same and different priorities. For instance, channel collision resolution may be perform for PUSCHs.

In Rel-17, UCIs with different priorities may be multiplexed on a PUCCH or PUSCH, and UCI multiplexing on a channel with different priority may be supported. Furthermore, for handling overlapping PUCCHs/PUSCHs with different priorities, the UE first resolves channels with the same priority in Step 1, then resolves channels with different priorities in Step 2. Additionally, Step 2 may include the following sub-steps: Step 2.1: Resolve collision of LP PUCCHs and HP PUCCHs; and Step 2.2: Resolve collision of PUCCHs and PUSCHs of different priorities.

Some examples of the systems and methods described herein may provide enhancements for overlapping between HP SR PUCCHs with LP PUSCH in Step 2. The HP SR multiplexing on LP PUSCH may be supported as enhancements for UCI multiplexing with different priorities, and different methods may be performed depending on the PUCCH and PUSCH overlapping conditions.

In Step 1, if a PUCCH with SR overlaps with a PUCCH with HARQ-ACK of the same priority, the SR may be multiplexed with the HARQ-ACK on a single PUCCH. For example, a HP SR may be multiplexed with a HP HARQ-ACK on a single HP PUCCH resource. Multiplexing methods may differ for different combinations of SR PUCCH formats and HARQ-ACK PUCCH formats, as described herein.

For up to 2 bits of HARQ-ACK, there may be 3 different cases:

Case 1: For overlapping of a HARQ-ACK with PUCCH format 0, and SR with PUCCH format 0 or PUCCH format 1 with the same priority, different cyclic shift values may be applied for positive SR from negative SR or no SR.

Case 2: For overlapping of a HARQ-ACK with PUCCH format 1, and SR with PUCCH format 1 with the same priority, channel selection may be used. Thus, the HARQ-ACK may be reported on the HARQ-ACK PUCCH resource for negative SR or no SR, and the HARQ-ACK may be reported on the positive SR PUCCH resources for a positive SR.

Case 3: For overlapping of a HARQ-ACK with PUCCH format 1, and SR with PUCCH format 0 with the same priority, the SR may be dropped even if it is positive (e.g., the SR may not be reported regardless of SR status).

In the above cases, Case 1 and Case 2 reports HARQ-ACK and SR together, thus, effectively, up to 2 HARQ-ACK bits and 1 extra bit for SR may be carried on the PUCCH resource with cyclic shift values or PUCCH selection. However, for Case 3, the SR may not be reported and only HARQ-ACK may be reported.

For more than 2 bits of HARQ-ACK, there may be one case:

Case 4: For overlapping of a HARQ-ACK with PUCCH format 2/3/4, and SR with PUCCH format 0 or PUCCH format 1 with the same priority, a number of bits may be generated to represent a positive or negative SR based on the overlapping conditions between the HP SR PUCCH configurations and the HARQ-ACK PUCCH. For example, if a UE is configured to transmit K PUCCHs for respective K SRs in a slot, as determined by a set of schedulingRequestResourceId and schedulingRequestIDForBFR, with SR transmission occasions that would overlap with a transmission of a PUCCH for HARQ-ACK with PUCCH format 2, PUCCH format 3 or PUCCH format 4 from the UE in the slot, the UE may generate $\lfloor \log_2(K+1) \rfloor$ bits representing a negative or positive SR, in ascending order of the values of schedulingRequestResourceId and schedulingRequestIDForBFR. If one of the SRs is a positive LRR, the value of the $\lfloor \log_2(K+1) \rfloor$ bits may indicate the positive LRR. An all-zero value for the $\lfloor \log_2(K+1) \rfloor$ bits may represent a negative SR value across all K SRs.

For more than 2 bits of HARQ-ACK, if there is (or are) overlapping SR PUCCH resource(s) with the HARQ-ACK PUCCH, the SR may be already reported regardless of positive or negative SR status.

For UCI multiplexing on PUSCH with different priorities, methods may be supported for enabling and disabling signaling:

In one method, enabling/disabling may be configured by higher layer signaling (e.g., RRC signaling). In this case, the multiplexing timeline may be assumed to be satisfied if overlapping occurs.

In another method, enabling/disabling may be dynamically indicated by DCI. If indicated by DCI, the UE may not check the timeline, and may assume the UCI multiplexing timeline is satisfied.

The enabling and disabling methods may be applied mainly for HARQ-ACK. For SR, it may be possible to configure by RRC signaling whether HP SR can be multiplexed on a LP PUSCH. In some examples, the HP HARQ-ACK multiplexing on LP PUSCH may be enabled by either RRC or dynamic DCI indication, and the HARQ-ACK multiplexing timeline may be satisfied regardless of enabling and disabling methods.

Since the HP HARQ-ACK and HP SR may be multiplexed in Step 1 above, in Step 2.2, the HP PUCCH overlapping with LP PUSCH, if the HP SR is dropped, the multiplexing procedure in Step 1 may be reversed. This may bring recursive procedures.

Because HP SR multiplexing on LP PUSCH is not supported currently, the LP PUSCH will be dropped, and the HP HARQ-ACK cannot be multiplexed on the LP PUSCH even if it is configured or explicitly indicated by DCI. In Step 1, the LP HARQ-ACK may be multiplexed on a LP PUSCH if the PUCCH for LP HARQ-ACK overlaps with the LP PUSCH. Therefore, if the LP PUSCH is dropped, the LP HARQ-ACK multiplexed on the LP PUSCH may also be dropped. Therefore, some enhancements may be considered for HP SR and HP HARQ-ACK multiplexing on a LP PUSCH. Different methods may be applied for different HP PUCCHs and LP PUSCH overlapping conditions.

Figure 9:
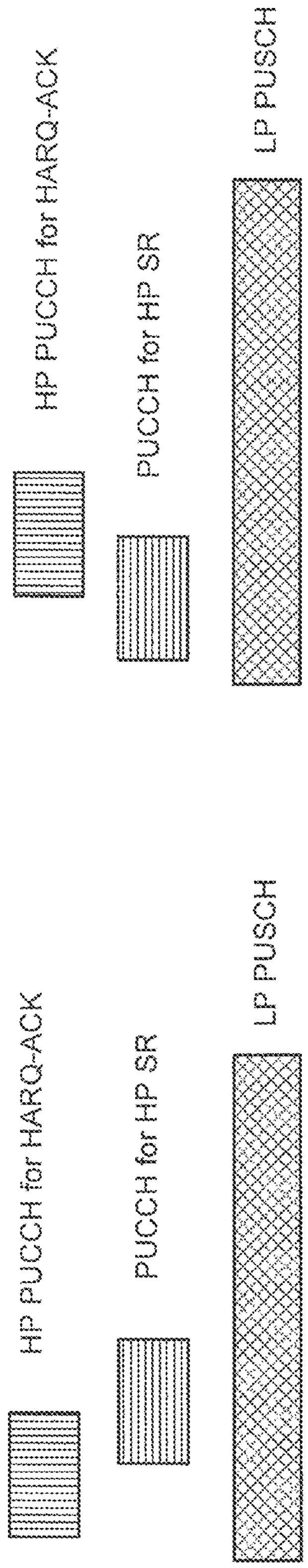
FIG. 9 is a diagram illustrating examples of overlapping conditions.

FIG. 9 is a diagram illustrating examples of overlapping conditions. In some examples, one or more of the operations described in relation to FIG. 9 may be performed by a UE (e.g., UE 102 described in relation to FIG. 1). In some examples, one or more of the operations described in relation to FIG. 9 may be performed by a base station (e.g., gNB 160 described in relation to FIG. 1). Some examples of the techniques described herein may provide enhancements of high priority SR multiplexing on LP PUSCH. In one overlapping condition (e.g., overlapping condition 1), as shown in FIG. 9, the HP HARQ-ACK PUCCH overlaps with one or more HP SR PUCCH resources and a LP PUSCH. For instance, FIG. 9 illustrates an example of an overlapping condition for HP HARQ-ACK, HP SR and LP PUSCH. In some examples of an overlapping condition (e.g., overlapping condition 1), a HP HARQ-ACK PUCCH overlaps with one or more HP SR PUCCH resources and a LP PUSCH, and the HP HARQ-ACK is up to 2 bits on a PUCCH resource using PUCCH format 0 or PUCCH format 1. In some examples, the UCI multiplexing approach in Step 1 may be performed first. The resulting PUCCH with HP HARQ-ACK and HP SR may overlap with a LP PUSCH.

- In current approaches, the HP SR multiplexing is not supported on PUSCH. Thus, there are ambiguities on UE behavior:
  - In one approach based on existing behavior, the HP SR is dropped regardless of positive or negative status, and only the HP HARQ-ACK is multiplexed on the LP PUSCH. This will cause the loss of a positive HP SR if it is triggered, and the Step 1 multiplexing is reversed.
  - In another approach, in case of a positive HP SR, the LP PUSCH is dropped, and the PUCCH carrying HP HARQ-ACK and HP SR is transmitted. This may conflict with the explicit dynamic DCI indication if the DCI indicates that HP HARQ-ACK should be multiplexed on the LP PUSCH.

As enhancement for HP HARQ-ACK and HP SR multiplexing on LP PUSCH, the HP HARQ-ACK and HP SR on the HP PUCCH may be multiplexed together on a LP PUSCH. The HP HARQ-ACK and HP SR bits may all be treated as HP HARQ-ACK for UCI multiplexing on LP PUSCH.

- In some examples of the techniques described herein, for up to 2 bits of HP HARQ-ACK:
  - For Case 1 overlapping of a HP HARQ-ACK with PUCCH format 0, and HP SR with PUCCH format 0 or PUCCH format 1, and/or for Case 2 overlapping of a HP HARQ-ACK with PUCCH format 1, and HP SR with PUCCH format 1, the UE may append 1 bit for HP SR to the HP HARQ-ACK. A bit of 1 may indicate a positive HP SR and a bit 0 indicates a negative HP SR. Thus, the combined up to 2 bits of HARQ-ACK and 1 bit of SR may be treated as HP HARQ-ACK bits and multiplexed on the LP PUSCH.
  - For Case 3 overlapping of a HARQ-ACK with PUCCH format 1, the SR may not be reported regardless of SR status. Potential approaches are described as follows:
    - In Approach 1, the HP SR may be dropped as on PUCCH. For instance, only the HP HARQ-ACK may be multiplexed on the LP PUSCH.
    - In Approach 2, the same enhancement may be applied for HP SR as in the other two cases. For example, the UE may append 1 bit for HP SR to the HP HARQ-ACK. A bit of 1 may indicate a positive HP SR and a bit 0 may indicate a negative HP SR. Thus, the combined up to 2 bits of HARQ-ACK and 1 bit of SR may be treated as HP HARQ-ACK bits and multiplexed on the LP PUSCH.
- Approach 2 may be beneficial for Case 3, since it introduces a unified solution for up to 2 bits of HP HARQ-ACK. The unified solution can be defined as follows. For overlapping of a HP PUCCH for up to 2 bits of HP HARQ-ACK with PUCCH format 0 or PUCCH format 1, and HP SR PUCCH resources with PUCCH format 0 or PUCCH format 1, the UE may append 1 bit for HP SR to the HP HARQ-ACK. A bit of 1 may indicate a positive HP SR and a bit 0 may indicate a negative HP SR. If the resulting HP PUCCH overlaps with a LP PUSCH, and if HP HARQ-ACK multiplexing on LP PUSCH is configured or indicated, the combined up to 2 bits of HARQ-ACK and the 1 bit of SR may be treated as HP HARQ-ACK bits and multiplexed on the LP PUSCH.

Some examples of the techniques described herein may provide enhancements of high priority SR multiplexing on LP PUSCH. In some examples of an overlapping condition, a HP HARQ-ACK PUCCH overlaps with one or more HP SR PUCCH resources and a LP PUSCH, and the HP HARQ-ACK is more than 2 bits on a PUCCH resource using PUCCCH format 2 or PUCCH format 3 or PUCCH format 4.

- For more than 2 bits of HARQ-ACK, for Case 4 overlapping of a HP HARQ-ACK with PUCCH format 2/3/4, and/or HP SR with PUCCH format 0 or PUCCH format 1, a number of bits may be generated to represent a positive or negative SR based on the overlapping conditions between the HP SR PUCCH configurations and the HARQ-ACK PUCCH. For example, if a UE is configured to transmit K PUCCHs for respective K SRs in a slot, as determined by a set of schedulingRequestResourceId and schedulingRequestIDForBFR, with SR transmission occasions that would overlap with a transmission of a PUCCH for HARQ-ACK with PUCCH format 2, PUCCH form 3 or PUCCH format 4 from the UE in the slot, the UE may generate $\lfloor \log_2(K+1) \rfloor$ bits representing a negative or positive SR, in ascending order of the values of schedulingRequestResourceId and schedulingRequestIDForBFR. If one of the SRs is a positive LRR, the value of the $\lfloor \log_2(K+1) \rfloor$ bits may indicate the positive LRR. An all-zero value for the $\lfloor \log_2(K+1) \rfloor$ bits may represent a negative SR value across all K SRs.

Thus, for overlapping of a HP PUCCH for more than 2 bits of HP HARQ-ACK with PUCCH format 2 or PUCCH format 3 or PUCCH format 4, and HP SR PUCCH resources with PUCCH format 0 or PUCCH format 1, the UE may append $\lfloor \log_2(K+1) \rfloor$ bits for HP SR to the HP HARQ-ACK. If the resulting HP PUCCH overlaps with a LP PUSCH, and if HP HARQ-ACK multiplexing on LP PUSCH is configured or indicated, the combined HP HARQ-ACK bits and the appended HP SR bits may be treated as HP HARQ-ACK and multiplexed on the LP PUSCH.

Note that for HARQ-ACK with PUCCH format 2/3/4, the SR bits may indicate not only the status, but also the index of the positive SR. This provides additional information compared with the 1 bit of SR multiplexed with HARQ-ACK with PUCCH format 0/1 where only a positive or negative SR value is indicated. Thus, as another enhancement for HP HARQ-ACK with PUCCH format 0/1, the same SR bit generation approach may be applied. However, this may introduce a different UCI multiplexing process for SR bits from the Step 1 overlapping between HP PUCCHs with HARQ-ACK and SR.

In another method, the above-mentioned approach may be applied only when there is a positive HP SR to be reported.

If there is no positive HP SR to be reported, the UE may multiplex only HP HARQ-ACK bits on LP PUSCH. Thus, the appended SR bits in Step 1 may be dropped.

If there is a positive HP SR to be reported, the UE may multiplex the combined HP HARQ-ACK and HP SR bits on LP PUSCH. Thus, the appended SR bits in Step 1 may be reported together as HP HARQ-ACK. For Case 3 overlapping of a HARQ-ACK with PUCCH format 1, the SR may not be reported regardless of SR status. Alternatively, an additional bit of "1" may be appended to the HP HARQ-ACK and multiplexed on the LP PUSCH.

With this method, the gNB may perform a different hypothesis assuming negative and positive SR, which may introduce additional procedures and complexity. It may be beneficial to include the SR bit(s) regardless of the SR status so that the gNB knows the exact number of UCI bits based on the overlapping conditions between the HP HARQ-ACK and HP SR PUCCH resources.

Figure 10:
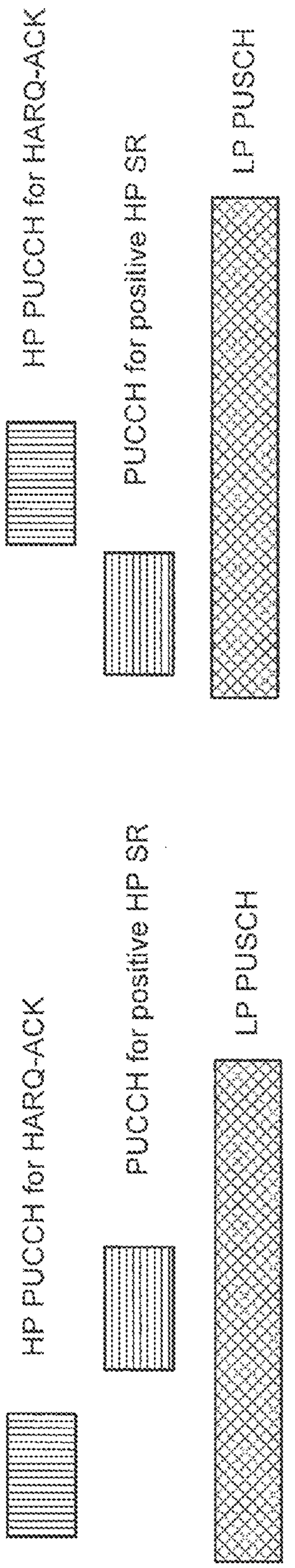
FIG. 10 is a diagram illustrating examples of overlapping conditions.

FIG. 10 is a diagram illustrating examples of overlapping conditions. In some examples, one or more of the operations described in relation to FIG. 10 may be performed by a UE (e.g., UE 102 described in relation to FIG. 1). In some examples, one or more of the operations described in relation to FIG. 10 may be performed by a base station (e.g., gNB 160 described in relation to FIG. 1). For instance, FIG. 10 illustrates another overlapping condition (e.g., overlapping condition 2) for HP HARQ-ACK, HP SR and LP PUSCH. Some examples of the techniques described herein may provide channel resolution for PUCCH with high priority HARQ-ACK, PUCCH with high priority SR and a LP PUSCH. Some examples of the techniques described herein may provide enhancements of channel dropping between high priority SR and LP PUSCH. In another overlapping condition (e.g., overlapping condition 2), as shown in FIG. 10, a LP PUSCH overlaps with a HP PUCCH for HARQ-ACK and a HP SR PUCCH with a positive SR, where the PUCCH with positive HP SR does not overlap with the HP PUCCH with HARQ-ACK. This overlapping condition may occur in several scenarios:

The HP HARQ-ACK PUCCH and the HP SR PUCCH with a positive SR may be in different subslots that overlap with the LP PUSCH, or The HP HARQ-ACK PUCCH and the HP SR PUCCH with a positive SR are in the same subslot but occupy symbols that do not overlap with each other. This may occur, for example, if both PUCCH are with short PUCCH formats, such as PUCCH format 0 and PUCCH format 2.

Under this overlapping condition (e.g., overlapping condition 2), the positive HP SR may not be multiplexed with the HP HARQ-ACK in Step 1 since there is no overlapping between their PUCCH resources. Thus, separate procedures may be defined for this overlapping condition.

In Approach A, the LP PUSCH may be dropped, and the HP PUCCH with HP HARQ-ACK and the HP SR PUCCH may be transmitted. In some examples, Approach A may guarantee delivery of the HP HARQ-ACK and the HP positive SR. For example, if the HP HARQ-ACK multiplexed on LP PUSCH is enabled or explicitly indicated, the UE may ignore the indication and may perform a fallback channel dropping behavior. On the other hand, since the gNB may not know the status of the HP SR in advance, the gNB may perform decoding based on a different hypothesis with or without HP SR.

In Approach B, the HP SR may be ignored and/or only the HP HARQ-ACK may be multiplexed on the LP PUSCH. In some examples, with the HP HARQ-ACK is multiplexed on the LP PUSCH, the LP PUSCH may be treated as HP for channel collision handling. For example, the positive HP SR may be ignored, the SR PUCCH may be dropped, and/or the LP PUSCH with HP HARQ-ACK may transmitted.

In Approach C, channel dropping may be determined based on the order of the HP PUCCH with HARQ-ACK and the HP PUCCH with positive SR. In this approach, the channel dropping behavior may be determined based on which HP PUCCH comes first. For example, if the HP PUCCH with HP HARQ-ACK starts earlier than the HP PUCCH with positive SR, the HP SR may be ignored, and the HP HARQ-ACK may be multiplexed on the LP PUSCH. If the HP PUCCH with positive HP SR starts earlier than the HP PUCCH with HP HARQ-ACK, the LP PUSCH may be cancelled, and the HP PUCCH with positive SR and the HP PUCCH with HARQ-ACK may be transmitted.

In Approach D, the HP HARQ-ACK may be multiplexed on the LP PUSCH, and/or the LP PUSCH with HP HARQ-ACK may be punctured at least from the overlapping symbol with the HP PUCCH with positive SR. In some examples, Approach D may be useful in cases where there is no overlapping between the HP SR PUCCH and the HP HARQ-ACK multiplexed symbols on the LP PUSCH. If there is overlapping between the HP SR PUCCH and the HP HARQ-ACK multiplexed symbols on the LP PUSCH, the HP HARQ-ACK multiplexed symbols may be dropped by the HP SR PUCCH. In some examples, dropping the HP-HARQ ACK multiplexed symbols may cause undesirable HP HARQ-ACK loss.

In some examples, Approach D may be conditional based on the HP HARQ-ACK multiplexed symbols on LP PUSCH. For example:

If there is no overlapping between the HP SR PUCCH and the HP HARQ-ACK multiplexed symbols on the LP PUSCH, the UE may cancel the LP PUSCH transmission at least from the overlapping symbol with the HP PUCCH with positive SR and after the HP HARQ-ACK multiplexed symbols.

If there is overlapping between the HP SR PUCCH and the HP HARQ-ACK multiplexed symbols on the LP PUSCH, the UE may cancel the LP PUSCH transmission, and transmit the HP PUCCH with HP HARQ-ACK and the HP PUCCH with the positive SR.

In some examples, for approaches (e.g., Approach A, Approach B, Approach C, and/or Approach D) under overlapping condition 2, the HP PUCCH with HARQ-ACK may include HP SR bit(s) if there is overlap with PUCCH resources for HP SR regardless of positive or negative SR status (as specified in overlapping condition 1 above, for instance). In this case, the approaches for overlapping conditions can be jointly applied with the methods under overlapping condition 1.

Alternatively, extra steps may be utilized based on whether there is positive HP SR under overlapping condition 1. For example:

If there is no positive HP SR multiplexed with HP HARQ-ACK under overlapping condition 1, Approaches A-D may be applied; and If there is a positive HP SR multiplexed with HP HARQ-ACK under overlapping condition 1 (already, for instance), the UE may ignore the positive HP SR under overlapping condition 2. Thus, the UE may report the HP HARQ-ACK and the positive HP SR as in overlapping condition 1 and/or may drop the other HP PUCCH with HP SR. For example, the UE may report only one positive HP SR when multiplexed on a LP PUSCH.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE), comprising:

a processor; and a memory storing instructions, wherein the instructions, when run by the processor, cause the UE to:

determine that a low priority (LP) physical uplink shared channel (PUSCH) overlaps with a high priority (HP) physical uplink control channel (PUCCH) for hybrid automatic repeat request-acknowledgement (HARQ-ACK) and a HP scheduling request (SR) PUCCH with a positive SR;

drop the LP PUSCH that overlap with the HP SR PUCCH with a positive SR;

not perform HP HARQ-ACK multiplexing on the LP PUSCH; and transmit the HP PUCCH with HP HARQ-ACK and the HP SR PUCCH with a positive SR.

2. A base station (gNB), comprising:

a processor; and a memory storing instructions, wherein the instructions, when run by the processor, cause the base station to:

determine that a low priority (LP) physical uplink shared channel (PUSCH) overlaps with a high priority (HP) physical uplink control channel (PUCCH) for hybrid automatic repeat request-acknowledgement (HARQ-ACK) and a HP scheduling request (SR) PUCCH with a positive SR wherein the LP PUSCH that overlap with the HP SR PUCCH with a positive SR is dropped, and HP HARQ-ACK multiplexing is not performed on the LP PUSCH; and receive the HP PUCCH with HP HARQ-ACK and the HP SR PUCCH with a positive SR.

3. A method performed by user equipment (UE), the method comprising:

determining that a low priority (LP) physical uplink shared channel (PUSCH) overlaps with a high priority (HP) physical uplink control channel (PUCCH) for hybrid automatic repeat request-acknowledgement (HARQ-ACK) and a HP scheduling request (SR) PUCCH with a positive SR, dropping the LP PUSCH that overlap with the HP SR PUCCH with a positive SR;

forgoing performing HP HARQ-ACK multiplexing on the LP PUSCH, and transmitting the HP PUCCH with HP HARQ-ACK and the HP SR PUCCH with a positive SR.

* * * * *